United States Patent [19]

Richards

[11] Patent Number: 5,042,928

[45] Date of Patent: Aug. 27, 1991

[54] PARALLEL CATADIOPTRIC OPTICAL ELEMENT

[75] Inventor: David A. Richards, Rochester, N.Y.

[73] Assignee: Eastman Kodak Company, Rochester, N.Y.

[21] Appl. No.: 482,100

[22] Filed: Feb. 20, 1990

[51] Int. Cl.⁵ .............................................. G02B 17/08
[52] U.S. Cl. .................................. 359/728; 359/724; 359/727
[58] Field of Search ............... 350/442, 443, 444, 440, 350/445, 446, 437, 523, 527

[56] References Cited

U.S. PATENT DOCUMENTS

| | | | |
|---|---|---|---|
| 929,795 | 8/1909 | Siedentopf | 350/444 |
| 1,977,689 | 10/1934 | Müller | 350/443 X |
| 2,638,033 | 5/1953 | Buchele et al. | 350/444 X |
| 2,682,197 | 6/1954 | Davis | 350/444 X |
| 2,683,394 | 7/1954 | Polanyi et al. | 350/443 |
| 4,109,304 | 8/1978 | Khvalovsky et al. | 350/167 X |
| 4,880,974 | 11/1989 | Yamakawa | 250/216 |

FOREIGN PATENT DOCUMENTS 497181 11/1950 Belgium ................................ 350/444
40859 12/1932 U.S.S.R.

OTHER PUBLICATIONS

Martin, L. C., *Technical Optics*, vol. II, London, Pitman & Sons, 1961, pp. 142-145 QC 381.M32.
Roger P. Loveland, "Photomicrography," vol. 11, John Wiley and Sons, Inc., New York (1970), pp. 532-533, QH251.L6.
H. Siedentopf, "Uber Ultramicroskopische Abbildung," Zietschrift Fur Wissenschaftliche Microskopie, 26, (1909), 391, p. 401.
Bohumil Jurek, "Optical Surfaces," Elsevier Scientific Publishing Co., New York (1977).

*Primary Examiner*—Paul M. Dzierzynski
*Assistant Examiner*—David R. Parsons
*Attorney, Agent, or Firm*—Svetlana Z. Short

[57] ABSTRACT

A single hybrid optical element combines reflective and refractive imaging. The optical unit utilizes a dual-reflector outer annulus zone and a refractive inner zone to achieve a high numerical aperture. This system is particularly suitable for, but not limited to, microscope objectives or for digital data storage applications.

5 Claims, 1 Drawing Sheet

PARALLEL CATADIOPTRIC OPTICAL ELEMENT

BACKGROUND OF THE INVENTION

1. Field of the Invention

The present invention relates to optics and, more particularly, to high numerical aperture optical elements particularly suitable for microscope objectives or for focusing or collimating light from coherent light sources.

2. Description Relative to the Prior Art

In a book entitled "Photomicrography" by Roger P. Loveland, published by John Wiley & Sons, Inc., N.Y. (1970), p. 532–533, the statement is made that: "In 1906, Siedentopf of Zeiss developed the cardioid dark field reflecting condenser. The cardioid is a heart-shaped curve with a familiar cusp. The surface of revolution on the axis of symmetry has some interesting optical properties. A spherical surface can be placed so that all rays originally parallel to the axis will be focused through the point of the cusp. Moreover, the resulting catoptric lens is aplanatic, anastigmatic, and of course, completely achromatic."

In 1932, D. D. Maksutov in U.S.S.R. Patent No. 40859, entitled Description of High Aperture Objective for Microscopes, described a solid version of this two surface reflecting system where the entrance and exit surfaces were defined normal to the rays so that no angular deviation occurred at either surface and the index of refraction of the medium was arbitrary. When used in a system having finite conjugates the asphere required is not exactly a cardioid, and, thus, the system is not exactly aplanatic.

The optical performance of the above-mentioned systems is good, but, because both systems are reflective systems, they both suffer from energy losses due to obscuration and are not suitable for applications requiring the combination of relatively high apertures, short focal lengths, and long working distances.

A refractive system meeting the foregoing criteria can be designed with spherical surfaces but requires many elements. However, to achieve a single element system, it is possible, for example, to use non-spherical so-called Cartesian surfaces to define a single element plano-convex lens that takes a collimated beam to a point focus. The parallel rays enter perpendicular to the plano surface and are undeviated until they exit through the convex surface, which is defined as a surface of revolution with a hyperbolic cross section, whose conic constant is the negative index of refraction squared and whose vertex radius is the desired back focus times the index of refraction minus one.

Although such a lens element is corrected for spherical aberration, it is not aplanatic, and thus, can not be used for very high numerical aperture applications.

Similarly, using conventional aspheric lens design programs, one can define such a lens with one or two aspheric surfaces. Such a lens will be corrected for spherical aberrations and may be corrected for coma. These lenses are commonly employed in CD players and recorders. However, it is difficult to design and manufacture such a lens with a numerical aperture beyond 0.55. In addition, these lenses tend to have a small working distance.

SUMMARY OF THE INVENTION

The present invention meets all of the above-mentioned criteria in a single hybrid optical element that contains a reflective outer annulus zone and a refractive inner core zone to produce a single catadioptric lens element of high quality and high efficiency. In a particular embodiment, the reflective outer annulus zone of the element utilizes Siedentopf's cardioid formulation and the refractive inner core zone utilizes the Cartesian formulation. A key requirement of this combination, for coherent applications, is the proper phasing of the two zones, which can readily be accomplished by tuning whichever zone is most convenient.

The advantages of such an implementation are many. By design, it is virtually free of spherical aberration. The outer annulus zone is aplanatic and achromatic. The inner core zone describes a much lower numerical aperture and, therefore, does not contribute significant aberrations. The total structure provides a very high numerical aperture and a reasonable working distance.

BRIEF DESCRIPTION OF THE DRAWING

The figure is a cross sectional side view of the illustrative preferred embodiment of the invention.

DETAILED DESCRIPTION OF THE PREFERRED EMBODIMENT

Figure 1:
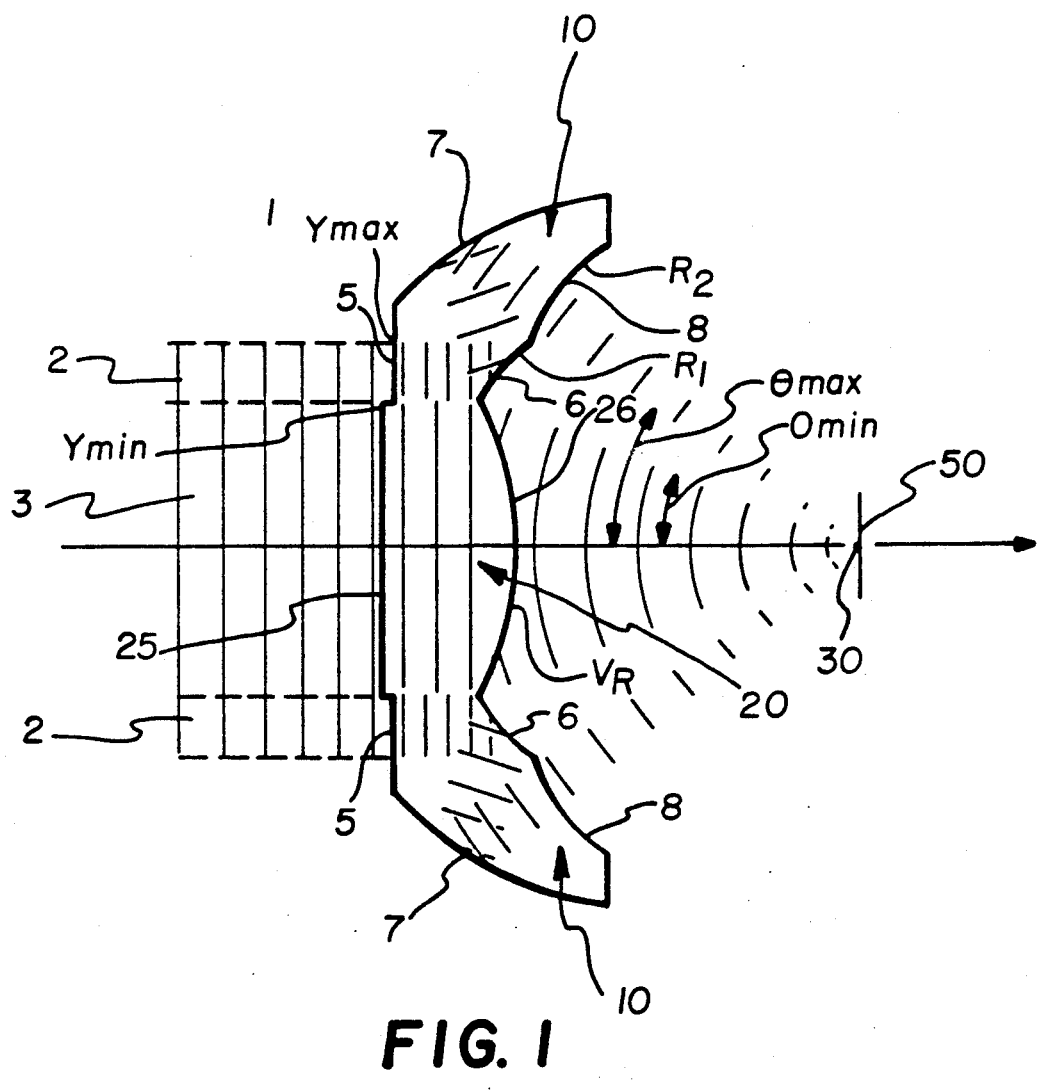

The illustrative preferred embodiment of the present invention is an implementation of an infinite conjugate micro-objective lens suitable for digital data storage application.

The incoming coherent collimated (parallel rays) beam represented by straight parallel wavefront lines is separated into two portions: outer portion 2 shown between broken lines and inner portion 3 surrounded by outer portion 2. The outer portion 2 of the beam passes through annular segment 5 of the optical element outer annulus zone 10, is reflected internally by annular surface segment 6 to annular (cardioidal) surface segment 7, which reflects it out of the optical element toward focal point 30 through annular surface segment 8. The first reflection, from surface 6 can be accomplished by total internal reflection, or by coating the primary reflective surface. The design is made such that both the inner core zone 20 and the outer annulus zone 10 have a common focus 30. The inner portion 3 of the beam is passed through planar surface 25 and convex surface 26 of the refractive inner core zone 20 of the system 1. However, the optical path lengths are different in each part of the system (the reflective path is longer). Therefore, a final tuning or polishing operation is-used to tune the optical element, preferably by removing a very small amount of additional material from the planar surface of the inner refractive core zone. Preferably, a phase plate, (similar to those used in phase microscopy) is added to the entrance surface of the inner core zone and is then tuned for coherent light applications.

An example of the design of a particular illustrative embodiment of the invention is given below, to provide a numerical aperture of 0.65 and a a working distance of 1 mm. or more, with collimated coherent input light.

First, an optical glass medium is chosen (operating in air) which has an index of 1.8434 at 780 nm. Since the Numerical Aperture: $NA = \sin(\theta_{max}) = 0.65$, where $\theta$ is the (half) exit angle, then $$\theta_{max} = 40.54°$$

Next, the clear aperture size is specified, as the size of a beam cross section; thus Clear Aperture: CA = 5.00 mm.
Index of Refraction: N = 1.8434
Therefore, the Focal Length FL can be calculated:

$$FL = y_{max}/\sin(\theta_{max}) = (CA/2)/NA = 3.846 \text{ mm}.$$

The radius of First Reflector R1 equals the Focal Length, R1 = 3.846 mm.

To maintain the first radius as a reflector by means of total internal reflection, $$\theta_{min} = \sin^{-1}(1/N) = 32.85°$$

The numerical aperture of the reflector minimum should be:

$$NA (\theta_{min}) = 0.54$$

$$y_{min} = R1 \cdot \sin(\theta_{min}) = 2.077 \text{ mm}.$$

$$SAG = 0.5342 \text{ mm}.$$

$$BF = 4.047 \text{ mm}.$$

$$VR = -3.414 \text{ mm}.$$

$$R2 = 4.6085 \text{ mm}.$$

$$NA_{REFRAC} = 0.375$$

$$\theta_{LIM} = 22.06°$$

Placing the refractor relative to the reflector requires knowing the sag (SAG) at this aperture and the back focus (BF) at the same time. Because the sag (SAG) is a function of the vertex radius (VR) of the refractive element, and therefore, of the back focus (BF) (VR = BF (N−1)), this must be solved iteratively. The center thickness (CT) is relatively arbitrary, limited only by reasonable constraints on weight and size. For this example, CT is chosen to equal 1.4530 mm. Overall thickness (TO) is also chosen in a similar manner with consideration for working distance, final aperture and structural concerns, for example, in this chosen case TO = 2.500 mm. This gives a working distance, WD = 3.00 mm.

The final computation is for the phase step. An optical path length computation is done for both paths and the difference converted to the thickness of the glass necessary to compensate. In the illustrative embodiment, this results in a correction of 0.222 microns for surface 5 or 25, relative to the design dimensions. Practically, this could be achieved by intentionally making the inner core zone slightly too thick and then tuning the core by polishing. Similar techniques could be used on tooling for molding many copies. (The phase step in the Figure is exaggerated for illustrative purpose.) In addition to, or instead of, having a hyperboloid surface, either both or one of the inner core surfaces can be made aspheric to further enhance the image quality. The diffraction pattern of such a lens when used in coherent illumination can be considered to be composed of three components. Each component represents the diffraction pattern of a different diameter circle. The intensity therefore could be described as:

$$I(r) = I_o \left\{ \frac{J_1(k_1 r)^{i\phi_1}}{k_1 r^e} - \epsilon \frac{J_1(k_2 r)^{i\phi_2}}{k_2 r^e} + K \frac{J_1(k_3 r)^{i\phi_3}}{k_3 r^e} \right\}^2$$

where
I is the intensity r is the radius in the diffraction pattern measured from center $I_o$ is a function of the input energy $J_i(k_i r)$ is the first Bessel function for the $i^{th}$ aperture portion where $k_1$ corresponds to the entire aperture size, $k_2$ corresponds to the portion of the aperture that is obscured and $k_3$ corresponds to the portion of the aperture filled by the refracted beam $\epsilon$ represents the fraction of the obscured beam portion K represents the fraction of the refracted beam $\phi_{1,2,3}$ represents the phase of each zone By an appropriate choice of phase and zonal ratios one can customize the resultant diffraction pattern. Using this approach, the second diffraction ring can be nulled thereby achieving a very high resolution spot. Similarly, aperture apodizing may also be used for this reason. Of course, to those skilled in the art it would be obvious that an optical element described above can be made of plastic as well as glass by utilizing different fabrication methods. These methods may include, but are not limited to:
1) Single-Point Diamond Turning (Plastic)
2) Plastic Injection Molding
3) Precision Glass Molding
4) Mosaic Assembly (Plug or Air/Glass)

The optical element can be easily modified for use with infinite as well as finite conjugates and can be used in many applications such as a microscope objective, in CD applications, or as a sub-part of another optical system.

The invention has been described in detail with particular reference to a presently preferred embodiment, but it will be understood that variations and modifications can be effected within the spirit and scope of the invention.

What is claimed is:

1. A single hybrid catadioptric optical element comprising a refractive inner core zone for focusing incoming light at a predetermined focal plane; and an outer annulus zone surrounding said core zone, said outer annulus zone having:
   (a) a surface element located at the object side of the optical element for admission of light into said outer annulus zone;
   (b) a convex acting annular reflective surface segment located at the image side of a concave portion of the optical element for reflecting incoming light to;
   (c) a concave acting annular cardioid reflective surface segment located on the object side of a convex portion of the optical element that in turn reflects said incoming light, out of said outer annulus zone through;
   (d) a refractive concave segment of said outer annulus zone said refractive concave segment located at the image side of the optical element, to focus said light at said focal plane.

2. A single catadioptric optical element according to claim 1, wherein said convex acting reflective surface segment reflects light toward said concave acting reflective surface segment by total internal reflection.

3. A single catadioptric optical element according to claim 1, wherein only a portion of said outer annulus zone has a reflective coating.

4. A single catadioptric optical element according to claim 1, wherein said refractive inner core zone has a plano-hyperbolic form.

5. A single catadioptric optical element according to claim 1, wherein the optical path difference between said outer annulus zone and said refractive inner core zone is brought into equal phase by tuning one of the zones.

* * * * *

UNITED STATES PATENT AND TRADEMARK OFFICE
CERTIFICATE OF CORRECTION

PATENT NO. : 5,042,928
DATED : August 27, 1991
INVENTOR(S) : David A. Richards

It is certified that error appears in the above-indentified patent and that said Letters Patent is hereby corrected as shown below:

Column 3, line 38, "TO" should read as --OT--.
         line 41, "TO" should read as --OT--.

Signed and Sealed this

First Day of March, 1994

Attest:

BRUCE LEHMAN

Attesting Officer     Commissioner of Patents and Trademarks